April 5, 1966 L. H. WIGGER 3,244,004
LIQUID LEVEL CONTROL APPARATUS
Filed June 12, 1964
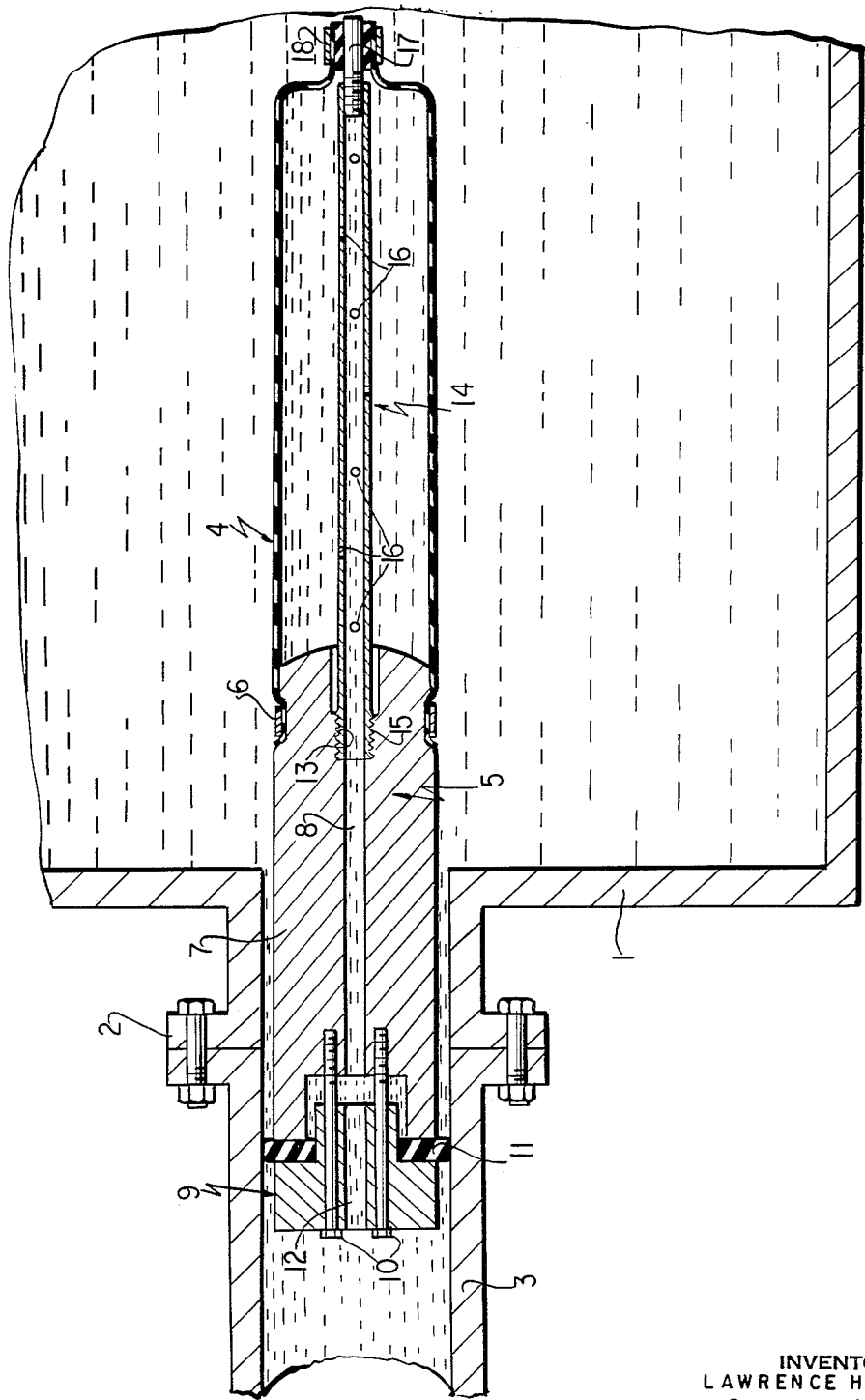
INVENTOR
LAWRENCE H. WIGGER
BY
ATTORNEY › # United States Patent Office 3,244,004
Patented Apr. 5, 1966

3,244,004
LIQUID LEVEL CONTROL APPARATUS
Lawrence H. Wigger, Bartlesville, Okla., assignor to Cities Service Oil Company, Bartlesville, Okla., a corporation of Delaware
Filed June 12, 1964, Ser. No. 374,619
4 Claims. (Cl. 73—299)

This invention relates to a liquid level control apparatus. More particularly, it relates to liquid level control apparatus employing a pressure sensing transducer that is effectively isolated from the liquid being controlled.

In many of its refinery and pipeline operations, the oil industry utilizes conventional automation equipment. This equipment has not generally been applicable to the automation of production operations where the product being controlled has not been refined or processed into a form easily handled or controlled by such equipment.

In controlling the level of a liquid in a processing vessel, pressure sensing transducers are frequently employed. Normally, a diaphragm pressure switch is used as a transducer in such applications. In production operations, it is often necessary to control crude oils containing varying amounts of paraffin and impurities that may interfere with the operation of the transducing device. For example, a paraffin in the crude oil tends to accumulate under the diaphragm or solidifies in the conductor pipe between the tank and the transducer rendering it inoperative.

Where the liquid to be sensed interferes with the operation of the transducing device, various means have been devised for isolating the transducer from the liquid being controlled. One such solution involves the trapping of an isolation fluid between the liquid medium being sensed and the transducer by means of a conductor tube extending into the body of the tank. The isolation fluid used to pack the conductor pipe has a specific gravity greater than that of the liquid in the tank. This arrangement has not proven satisfactory because the isolation fluid eventually becomes displaced from the open conductor tube.

Another means for entrapping an isolation fluid between the liquid medium to be sensed and the transducer involves the installation of a membrane diaphragm in communication with the tank fluid, with the isolation fluid entrapped between the membrane diaphragm and the transducer. This arrangement has been hampered by the accumulation of paraffin on the diaphragm membrane. Paraffin accumulation on the tank wall and membrane often reaches six inches in depth due to the fact that fluid temperatures near the membrane generally reflect ambient conditions that rapidly dissipate fluid heat to the atmosphere during the winter months.

Another solution attempted involves the installation of electrical heating elements to keep the paraffin in solution. While this solution is generally satisfactory, operating problems result since the heaters must either be thermostatically or manually controlled. In the absence of heat, as during electrical power failures, the paraffin tends to solidify and interfere with the transducer as indicated above.

It is an object of the present invention to provide a liquid level control apparatus employing pressure sensing transducers.

It is another object of this invention to provide a liquid level control apparatus suitable for use in oil production operations.

It is another object of this invention to provide a liquid level control apparatus in which the pressure sensing transducer is isolated from the liquid being controlled.

It is a further object of this invention to provide a liquid level control apparatus whose operation and sensitivity are not affected by the presence of impurities and materials in the liquid being controlled that tend to deposit upon the walls of the processing vessel.

With these and other objects in view, an embodiment of the present invention is hereinafter described with reference to the accompanying drawing having parts both in section and broken away.

The objects of this invention are accomplished by employing a liquid packed flexible tubular sleeve as an isolation device in conjunction with a pressure sensing transducer. The tubular sleeve is positioned within the processing vessel by means of a seating device mounted on the processing vessel as described below.

In the drawing, the tank containing a liquid whose level is to be measured is represented by the numeral 1. A flanged mounting connection 2 provides a means for securing conductor tube 3, which is in communication with conventional pressure sensing transducer, which is not shown.

In order to isolate the transducer from the liquid in tank 1, flexible tubular sleeve 4 is positioned inside the tank well beyond the cold paraffin zone of the tank wall. This flexible tubular sleeve is attached to seating assembly 5 by means of stainless steel clamp 6.

Flexible tubular sleeve 4 may be composed of any material compatible with the liquid within the tank and the temperature ranges likely to be encountered. For example, a flexible Buna N sleeve is satisfactory for liquid level indicating operations involving crude oil.

Seating assembly 5 has a main body portion 7 having a longitudinally extending bore 8. The end of body portion 7 outside the tank has a recess adopted to accommodate seating plug 9. This seating plug is secured to main body portion 7 by means of seating studs 10.

A flexible seal ring 11 is provided to prevent communication of the liquid inside the tank with the inside of the sensing unit. Tightening seating studs 10 extrudes seal ring 11 and increases its outside diameter to form a seal between the seating assembly and the inside of the mounting connnection 2. Seating plug 9 contains a bore 12 that communicates with bore 8 in main body portion 7 and with the conductor tube 3 leading to the pressure sensing transducer.

At the end of main body portion 7 that is within tank 1, bore 8 has an enlarged internally threaded section 13. Internal stabilizing tube 14 is secured to main body portion 7 by means of externally threaded section 15 that fits within enlarged section 13 of body portion 7. Stabilizing tube 14 has numerous fluid conductor ports 16 along its length, thereby providing communication between the inside of flexible tubular sleeve 4 and the inside of stabilizing tube 14. Cap plug 17 is inserted in the end of stabilizing tube 14 extending furthermost into the tank and the end portion of flexible tubular sleeve 4 is attached thereto by means of stainless clamps 18, thereby sealing the innermost portion of the unit against communication with the liquid in the tank. Stabilizing tube 14 holds flexible tubular sleeve 4 in one position so as to prevent movement and eventual fatigue failures.

After the transducer has been connected to the seating assembly, by means of conductor tube 3 and flanged mounting connection 2, the entire unit is filled with a suitable isolation liquid. Any liquid compatible with operating conditions, so that it will neither freeze nor vaporize, and with the material used to construct the flexible tubular sleeve may be used. For example, hydraulic fluid and water and ethylene glycol mixtures are suitable isolation fluids.

In operation, an increase or decrease in the static head or pressure of the liquid in the tank on the flexible tubular sleeve is transmitted by the isolation fluid through the stabilizing tank tube, the seating assembly and the conductor tube to the pressure sensing transducer. The transducer translates the pressure variations due to the changing level of liquid in the tank into some form of signal that can be used to automatically control the operation in question. Since the transducer is entirely isolated from the liquid in the tank, its operation is not affected by any paraffin or impurities in the liquid in the tank. Since the flexible tubular sleeve is positioned within the tank sufficiently to avoid the cold paraffin zone along the tank wall, paraffin deposition along the tank wall does not interfere in any way with the operation of the unit.

The large effective area of the flexible tubular sleeve provided by the present invention results in a high degree of sensitivity and reliability. Any operating pressure can be tolerated since the unit is completely pressure balanced. Since the unit operates on a fluid displacement basis, the total displacement required by the transducer must be less than that available at complete compression of the liquid packed flexible sleeve.

It will be understood that various changes in the details and arrangements of parts, which have been herein described and illustrated in order to explain the nature of the invention, may be made by those skilled in the art within the principle and scope of the invention as expressed in the appended claims.

I claim:
1. An apparatus for measuring liquid level in a tank by means of a pressure sensing transducer that is isolated from the liquid medium to be sensed comprising in combination:
    (a) a tank containing a liquid, the changing level of which is to be measured, said tank having a mounting connection near the bottom of the tank wall;
    (b) a pressure sensing transducer for sensing changes in the hydraulic pressure due to the changing level of liquid in the tank;
    (c) a conductor tube mounted on said tank mounting connection, said conductor tube communicating with the pressure sensing transducer;
    (d) a flexible tubular sleeve positioned within the tank, the inside of such sleeve being isolated from communication with the liquid in the tank;
    (e) a seating assembly extending through said mounting connection into said tank, said seating assembly being attached to the flexible tubular sleeve and having means for communication between the inside of the flexible tubular sleeve and said conductor tube;
    (f) an isolation liquid contained within the flexible tubular sleeve, the seating assembly, and the conductor tube communicating with said transducer, said isolation fluid serving to transmit changes in the hydrostatic pressure on the flexible tubular sleeve to the transducer,
whereby the transducer is isolated from the liquid in the tank that may contain materials that interfere with the operation of the transducing device and the flexible tubular sleeve is so positioned as to avoid the difficulties that result from the accumulation of deposits along the walls of the tank.

2. The apparatus of claim 1 in which the seating assembly comprises:
    (a) a body portion having a longitudinally extending bore providing communication between the inside portion of said flexible tubular sleeve and the conductor tube;
    (b) mechanical means for attaching said flexible tubular sleeve to said body portion;
    (c) a seating plug adapted to be secured to the end of said body portion extending outside the tank, said sealing plug having a longitudinally extending bore providing communication between the body portion and the conductor tube;
    (d) a flexible sealing ring positioned between said body portion and said sealing plug, said sealing ring being adapted to form a seal between the seating assembly and the inside of the mounting connection upon tightening of the sealing plug.

3. The apparatus of claim 2 and including an internal stabilizing tube attached to the end of the body portion extending into the tank and positioned within said flexible tubular sleeve, said internal stabilizing tube being adapted to hold the flexible tubular sleeve in one position, preventing eventual fatigue, said stabilizing tube containing fluid conductor ports providing communication between the inside of said flexible tubular sleeve and the body portion of said seating assembly.

4. The apparatus of claim 3 in which the means for isolating the inside of the flexible tubular sleeve from the liquid in the tank includes a cap plug in the end of said stabilizing tube extending furthermost into the tank and mechanical means for securing the innermost end of said tubular sleeve to said stabilizing tube.

No references cited.

LOUIS R. PRINCE, *Primary Examiner.*